US006769382B2

US 6,769,382 B2

(12) United States Patent
Chiu

(10) Patent No.: US 6,769,382 B2
(45) Date of Patent: Aug. 3, 2004

(54) FLUSH TOILET FOR A DOG

(76) Inventor: Chui-Wen Chiu, 9 Nordic Place, Toronto, Ontario (CA), M3A 2H8

( * ) Notice: Subject to any disclaimer, the term of this patent is extended or adjusted under 35 U.S.C. 154(b) by 0 days.

(21) Appl. No.: 10/686,649

(22) Filed: Oct. 17, 2003

(65) Prior Publication Data
US 2004/0089243 A1 May 13, 2004

(51) Int. Cl.⁷ .............................................. A01K 29/00
(52) U.S. Cl. ....................................................... 119/162
(58) Field of Search ................................ 119/161, 162, 119/163, 164, 165, 174

(56) References Cited

U.S. PATENT DOCUMENTS

| 3,818,865 | A | * | 6/1974 | Sinclair | 119/161 |
| 4,242,763 | A | * | 1/1981 | Walker | 119/164 |
| 4,729,342 | A | * | 3/1988 | Loctin | 119/163 |
| 5,048,463 | A | * | 9/1991 | Wilson et al. | 119/163 |
| 5,363,807 | A | * | 11/1994 | Kakuta | 119/161 |
| 5,494,001 | A | * | 2/1996 | Leibowitz | 119/163 |
| 5,640,928 | A | * | 6/1997 | Rymer | 119/162 |
| 5,785,000 | A | * | 7/1998 | Barbary | 119/166 |
| 6,418,880 | B1 | * | 7/2002 | Chiu | 119/162 |
| 6,453,844 | B1 | * | 9/2002 | Janzen et al. | 119/163 |
| 6,457,435 | B1 | * | 10/2002 | Bridges | 119/163 |

* cited by examiner

Primary Examiner—Charles T. Jordan
Assistant Examiner—Judith A. Nelson

(57) ABSTRACT

The flush toilet is suitable for use by dogs of various physical sizes. The toilet has two high side wall portions to collect the urine ejected by a male dog. A restraint frame is provided for retaining the dog on a leash in the toilet. The position of the restraint frame is adjustable to accommodate a dog of any size such that the excrement will drop in or close to the drain opening of the toilet. A grid pattern is formed on the inner surface of the high side wall to facilitate the male dog from urinating, and a baffle wall is provided at the front edge of the high side walls to avoid the urine from a male dog from splashing outside of the toilet.

7 Claims, 4 Drawing Sheets

FLUSH TOILET FOR A DOG

TECHNICAL FIELD OF THE INVENTION

This invention relates to flush toilets for domestic animals and more particularly relates to a flush toilet suitable for use by dogs of various physical sizes.

BACKGROUND OF THE INVENTION

Domestic pets such as dogs provide love and companionship to human being, but they also create the daunting task for the owners to provide a toilet facility for them to defecate. Owners may take their dogs outdoors to defecate and then collect the excrements for disposal. This may be a pleasant task to carry out in fine outdoor conditions, even if the owners have to get up from bed very early in the morning to do so or to take the pets out very late at night; but in bad weather conditions, such task is particularly distressful to perform. Attempts have been made to provide an indoor toilet facility for dogs such that the owners do not have to content with the above problems and to dispose of the dogs' excrements readily and conveniently indoors. It has been problematic in providing an indoor toilet facility for dogs; and the excrements, if not disposed of, would contaminate the indoor atmosphere and create an unpleasant smell and a harmful environment to health.

Heretofore, attempts have been made to provide toilets for dogs such that it is no longer necessary to take them outdoor to defecate, and the excrements may be disposed of readily indoors. Dogs defecate in a standing position which is different than that of a human. Therefore, a toilet for dogs must provide means for them to get on and off the toilet as well as in the toilet in use in a standing position. Furthermore, known toilets are not satisfactory in that they are not suitable for use by dogs of various physical sizes so that the excrements may not be deposited at the intended location of the toilet by the dog to facilitate their disposal. Accordingly, it has been necessary to provide toilets of different sizes for dogs of different physical sizes, which is particularly troublesome to achieve and is economically not feasible for a household having dogs of different physical sizes. Since the physical sizes of dogs vary greatly in different breeds, owners having dogs of various physical sizes have been faced with the harrowing task of providing an indoor flush toilet suitable for use by different dogs.

Furthermore, male dogs urinate in a different way then female dogs. Male dogs urinate by raising one hind leg and turning their body to discharge the urine sideways. Known toilet has no provision to collect the urine from male dogs such that the urine may be ejected sideways beyond the side of the toilet.

SUMMARY OF THE INVENTION

It is a principal object of the present invention to provide a flush toilet suitable for use by dogs of various sizes.

It is another object of the present invention to provide a flush toilet having means for male dogs to urine within the toilet.

It is another object of the present invention to provide a flush toilet having means for enticing the dog to use the toilet.

DETAILED DESCRIPTION OF THE PREFERRED EMBODIMENTS

Figure 1:
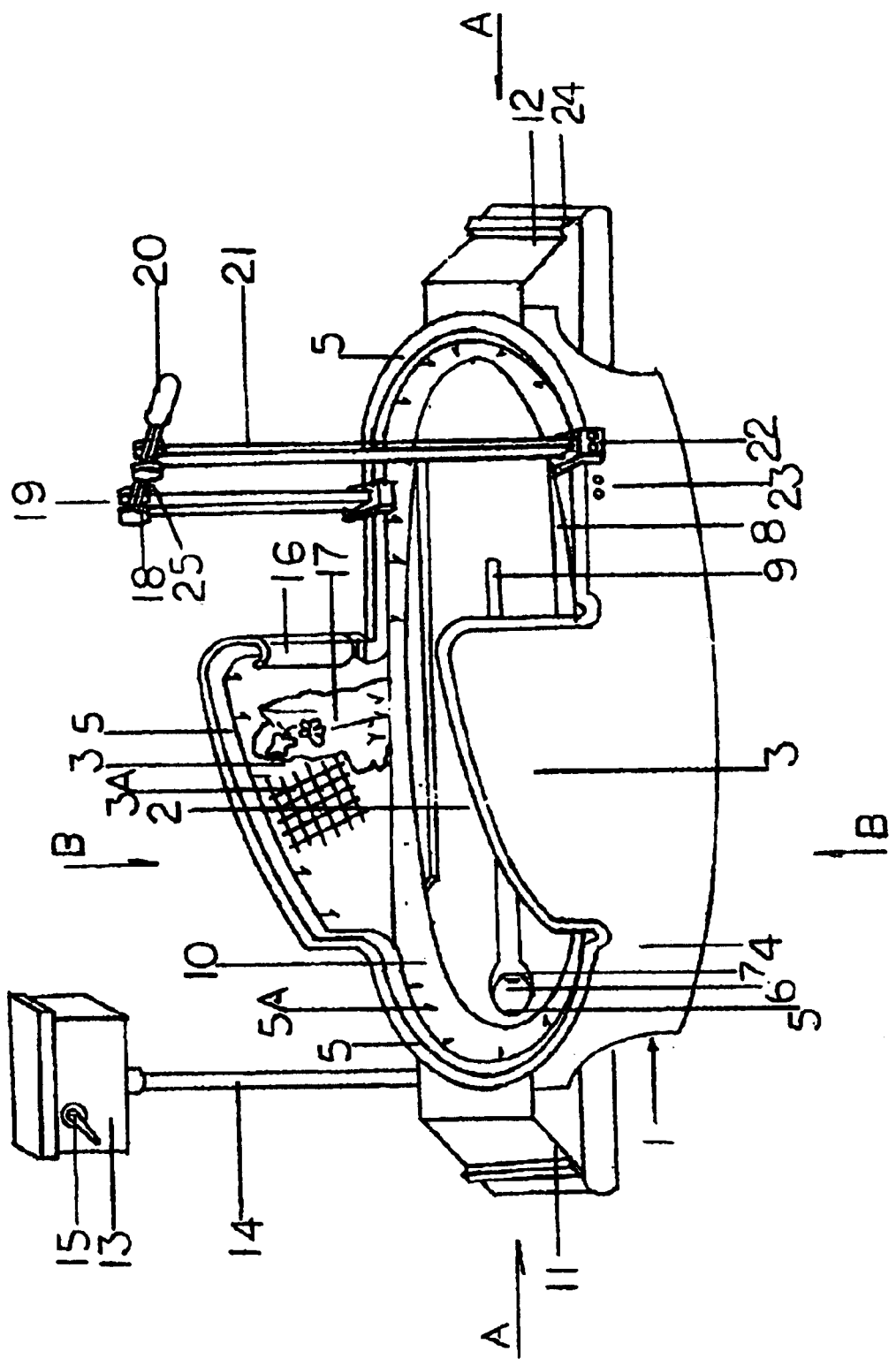
FIG. 1 is a perspective side elevation view of the flush toilet according to the present invention.
Figure 2:
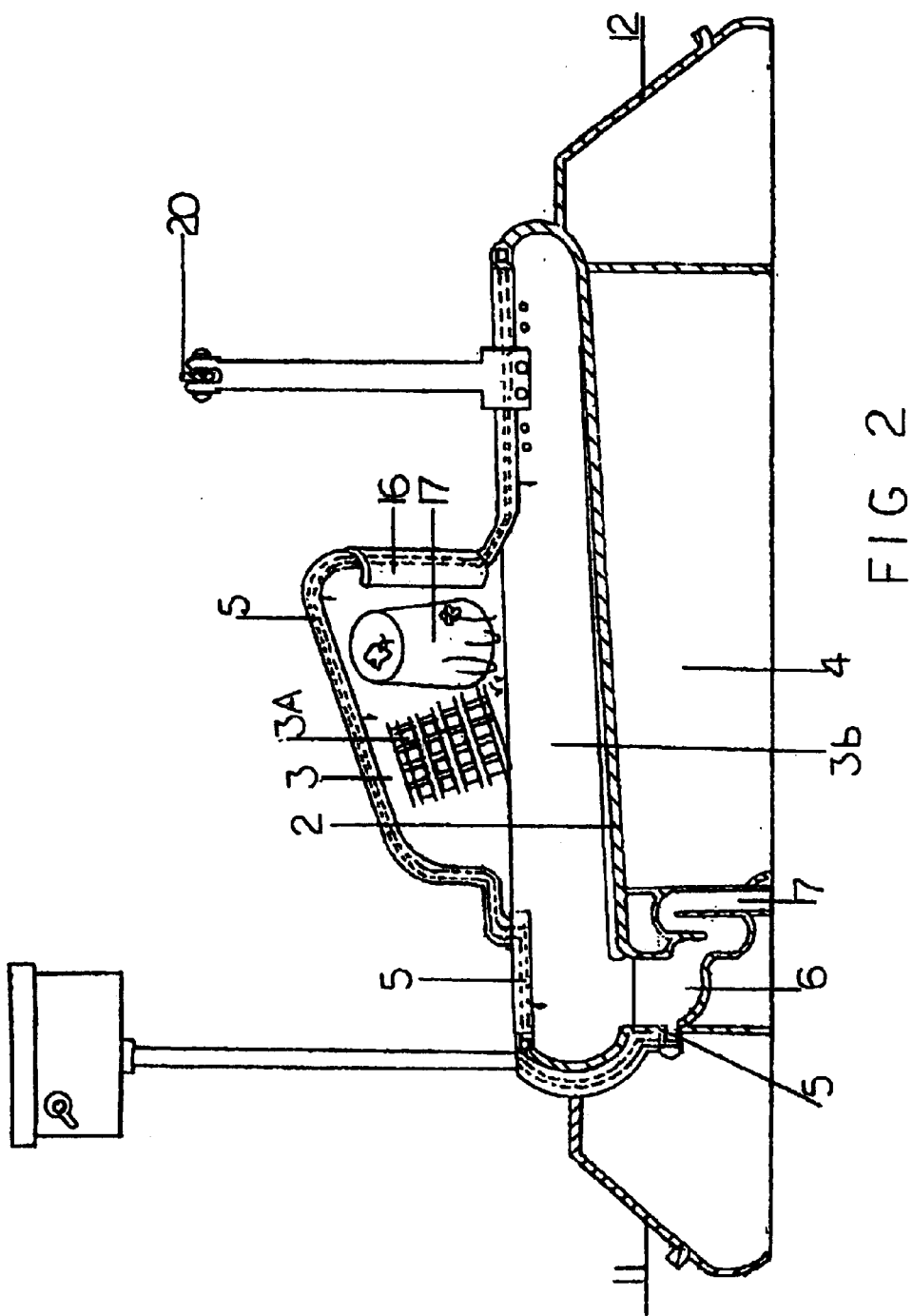
FIG. 2 is a sectional side elevation view along the section line A—A of FIG. 1.
Figure 3:
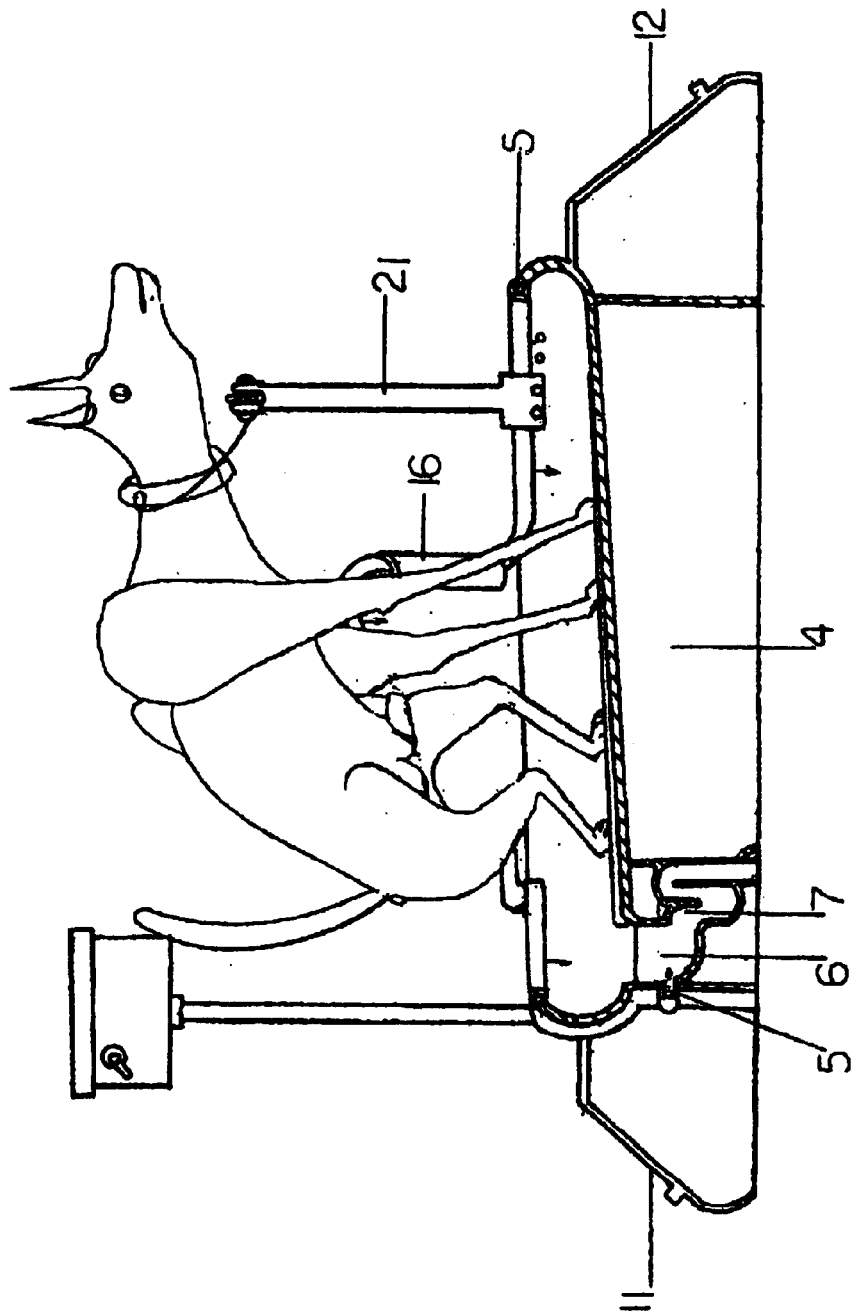
FIG. 3 is a partial sectional side elevation view showing a dog using the toilet of the present invention.
Figure 4:
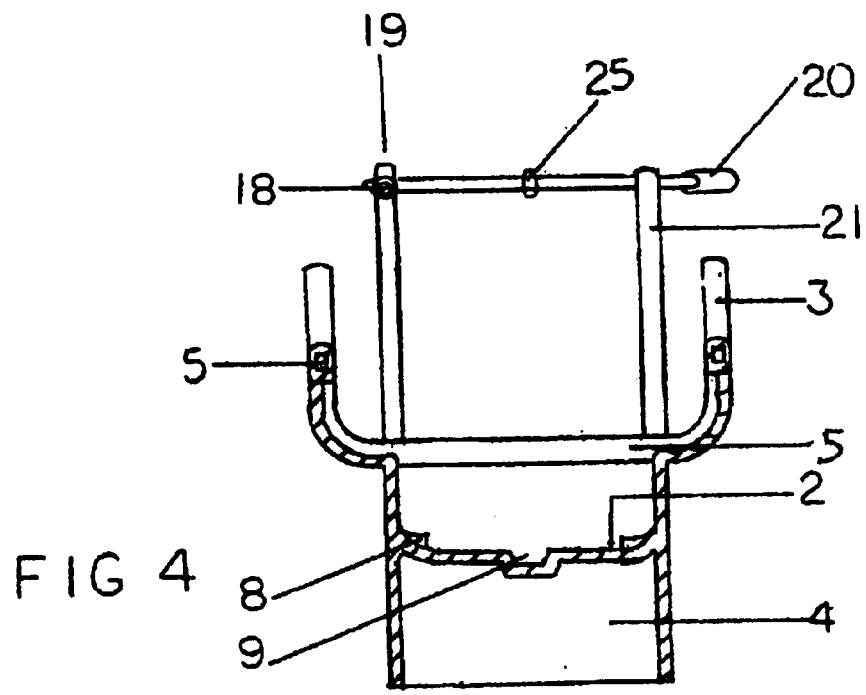
FIG. 4 is a sectional front elevation view along section line B—B of FIG. 1.
Figure 5:
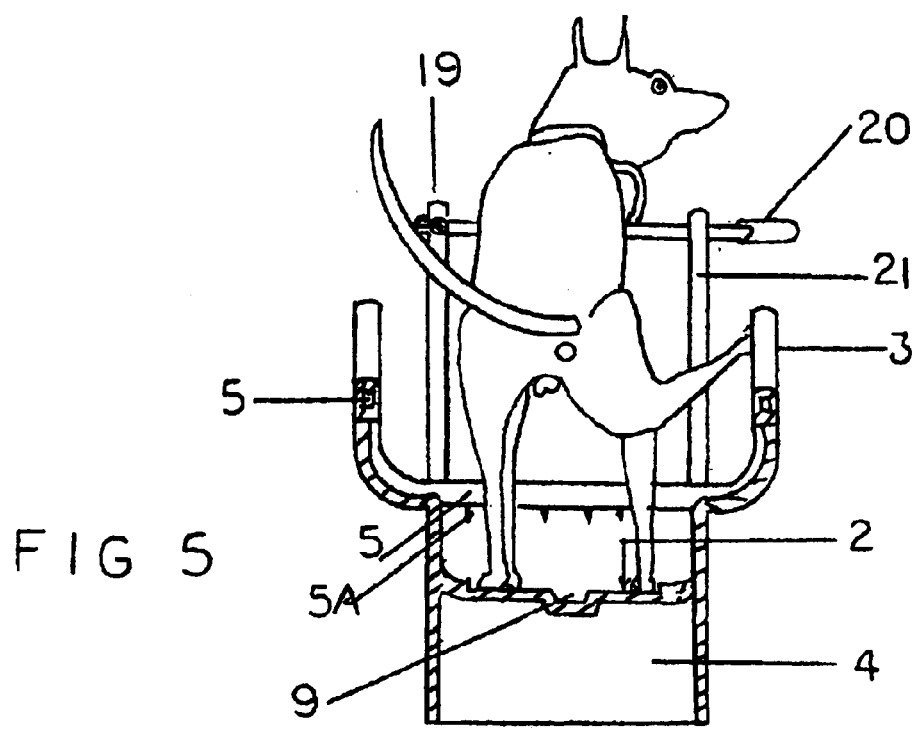
FIG. 5 is a partial sectional front elevation view showing a male dog urinating in the flush toilet of the present invention.

With reference to the drawings in which like reference numerals designate corresponding parts in the several views, the flush toilet 1 of the present invention has a flat platform 2 to facilitate a dog to stand thereon as best shown in FIG. 3. The flush toilet 1 may be generally oval in shape as shown; however, it may be appreciated that it may be rectangular or other shapes to serve the same purposes. The platform 2 may have dimensions of approximately 75 cm by 35 cm which would be sufficiently large to accommodate a dog of any size to stand in it with its hind quarter tugged forwardly and inwardly, as shown in FIG. 3, to use the toilet. The platform 2 has two upstanding high side wall 3 located at two opposite sides of the platform and extending from a middle portion of the toilet to its rear portion. A grid pattern 3A is formed at the inner surface of the high side wall 3. The grid pattern 3A is for supporting the raised hind leg of the male dog when it is urinating in the toilet. The remaining edges of the platform 2 is surrounded by a lower upstanding side wall 10. The platform 2 is supported by a base 4; and the high side walls 3 and the lower side wall 10 may be integrally formed around the edge portion of the base 4. A water duct 5 is located along the upper edge portion within the high side walls 3 as well as the lower side wall 10 and it is adapted to conduct the water to a plurality of water outlet openings 5A located evenly over the inner side of the upper edge portion of the high side walls 3 and the lower side wall 10 for flushing and cleaning the platform 2. An excrement collecting drain opening 6 is located at the rear central portion of the platform 2. The drain opening 6 communicates with the water duct 5 and the U-shaped trap 7 of the plumbing drain. Two elongated shoulder steps 8 are provided along the two side edge portions of the platform 2.

An elongated channel 9 is located at the central portion of the platform 2 and it extends from the drain opening 6 to about the middle front portion of the platform 2. The channel 9 serves to direct the excrement washed by the flush water into the drain opening 6.

A sloping ramp 11 is provided at the rear end of the toilet 1 to facilitate the dog from entering the toilet; and another sloping ramp 12 is provided at the front end for the dog to depart from the toilet.

A water storage tank 13 similar to the common toilet water storage tank is provided for supplying the flush water for the toilet through a pipe 14. The storage tank 13 is preferably located at a higher elevation than the toilet 1 in order to provide better water pressure for the flush water to enhance the cleaning of the excrement from the platform 2. A pivotal handle 15 is provided at the water storage tank similar to a conventional flush toilet for activating the flush system in the water tank to deliver the water for flushing the platform 2.

Narrow width baffle wall portions 16 are located at the front edge of the upstanding high side walls 3 and extending perpendicular to the high side walls 3 and preferably curving a short distance inwards toward the center of the toilet. These baffle wall portions 16 may be formed integrally on the side walls 3 and they serve to prevent the urine ejected by a male dog on the side walls 3 to splash forwards out of the toilet 1. A pictorial depiction 17 such as an outdoor scenery is provided on the inner surface of the high side walls 3 for enticing the dog to defecate and urinate.

A restraint frame 19 is adjustably mounted at the front of the toilet. The restraint frame 19 has a cross bar 20 with one end hingedly mounted at the upper end 18 of the one of two vertical posts 21. The vertical posts 21 have a U-shaped upper end so that the cross bar 20 is pivotally mounted at the U-shaped upper end of one post, and its free end portion may be pivoted downwards to engage with the U-shaped upper end of the other post so as to be retained securely in a mounted position. An inverted U-shaped bracket 22 is provided at the bottom end of the vertical posts 21 for mounting the restraint frame 19 to the side wall 10 of the toilet 1. Adjustable mounting bolts may be provided at the bracket 22, which are operative for securing the restraint frame 19 firmly in place. The bolts are engageable with mounting openings 23 formed at the end portion of the side wall of the toilet 1. The position of the restraint frame 19 may be varied forwards or rearwards adjustably by engaging the bolts of the bracket 22 with selected mounting openings 23.

Steps 24 are provided on the sloping rear ramp 11 and front ramp 12 to facilitate the entry and departure of the dog to and from the toilet 1, and a mounting ring 25 is provided on the cross bar 20.

The toilet 1 may be fabricated with a porcelain, metal or plastic material.

In use, the dog is led with a leash to enter the toilet 1 from the rear ramp 11, then the leash is mounted to the mounting ring 25 of the cross bar 20 of the restraint frame 19 to retain the dog within the toilet. The position of the restraint frame 19 is then adjusted until the rear end of the dog is positioned at or close to the drain opening 16 so that when it defecates the feces will be deposited either directly or close to the drain opening 16. In this manner, the toilet may be used by dogs of various sizes. After the dog has defecated or urinated, the leash is unlatched from the mounting ring 25 and the cross bar 20 is pivoted upwards to let the dog to leave the toilet through the front ramp 12. The toilet is cleaned immediately by pressing the handle 15 to cause the flush water to inject into the toilet through the water openings 5.

Obviously, numerous modifications and variations of the present invention are possible in light of the above teachings. It is therefore to be understood that within the scope of the appended claims, the invention may be practiced otherwise than as specifically described above. For example, the toilet may also be used by other domestic animals such as cats.

Wisdom is bred by education and wisdom brings further wisdom, for this reason, I would donate 30% of the profit derived from this invention for the education of gifted students from poor families.

What I claim is:

1. A flush toilet for dogs having various physical sizes, comprising
    a generally flat platform adapted for a dog to stand and deposit excrements thereon,
    two upstanding opposite high side wall portions extending from a middle portion to a rear end of said platform,
    two low baffle walls formed at a front edge of said high side wall portions and extending perpendicular to said high side wall portions, said baffle walls being adapted to prevent urine ejected by a male dog against said high side wall portions from splashing out of said toilet,
    a restraint frame adjustably mounted on said side wall portions and adapted for retaining the dog within said toilet, said restraint frame being adjustable to a selected position for accommodating a dog of any physical size to stand within said toilet,
    a water duct located within an upper edge portion of said side wall portions,
    a plurality of water openings formed around said edge portion of said side wall portions and operative for injecting flush water delivered from said water duct for flushing and cleaning said platform,
    a drain opening located at a middle front position of said platform and adapted to dispose excrements flushed from said platform by said flush water.

2. A flush toilet according to claim 1 including a grid pattern and a pictorial depiction of an outdoor scenery provided an inner surface of said high side wall portions.

3. A flush toilet according to claim 2 wherein said restraint frame includes two vertical posts having a U-shaped upper end and an inverted U-shaped bracket located at a lower end therein, adjustable mounting means provided at said bracket for mounting said posts to said side wall, a cross bar having one end hingedly mounted to the U-shaped upper end of one of said posts and having a free end pivotally engageable with the U-shaped upper end of the other one of said posts to located in a transverse position above said platform, and said posts being adjustable to locate at a selected position of said side wall for accommodating said pet of any physical size standing within said platform.

4. A flush toilet according to claim 3 including a mounting ring provided on said cross bar.

5. A flush toilet according to claim 4 wherein said toilet is made selectively of a porcelain, metal, and plastic material.

6. A flush toilet according to claim 5 including an elongated channel formed at a center of said platform, said channel extending from said drain opening to a front portion of said platform.

7. A flush toilet according to claim 6 including a sloping ramp provided at said front end and at said rear end of said platform.

* * * * *